(12) United States Patent
Bogdanov et al.

(10) Patent No.: US 9,940,206 B2
(45) Date of Patent: *Apr. 10, 2018

(54) HANDLING FAILED CLUSTER MEMBERS WHEN REPLICATING A DATABASE BETWEEN CLUSTERS

(71) Applicant: International Business Machines Corporation, Armonk, NY (US)

(72) Inventors: Kirill Bogdanov, Mountmellick (IE); Mark Dennehy, Stepaside (IE); Diarmuid Flynn, Dublin (IE); Bruce M. Jackson, Portland, OR (US); Marzia Mura, Sandyford (IE); Effi Ofer, Ramat Gan (IL); Jason C. Young, Portland, OR (US); Roger L. Q. Zheng, Toronto (CA); Yuke Zhuge, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 105 days.

This patent is subject to a terminal disclaimer.

(21) Appl. No.: 14/972,194

(22) Filed: Dec. 17, 2015

(65) Prior Publication Data

US 2016/0103740 A1   Apr. 14, 2016

Related U.S. Application Data

(63) Continuation of application No. 14/224,462, filed on Mar. 25, 2014, now Pat. No. 9,251,017.

(51) Int. Cl.
G06F 11/00 (2006.01)
G06F 11/14 (2006.01)
G06F 11/20 (2006.01)

(52) U.S. Cl.
CPC ...... *G06F 11/1469* (2013.01); *G06F 11/1451* (2013.01); *G06F 11/20* (2013.01); *G06F 11/2002* (2013.01); *G06F 11/2023* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| 7,392,421 B1 * | 6/2008 | Bloomstein ......... G06F 11/1482 714/4.4 |
| 7,917,469 B2 | 3/2011 | Bernhard et al. |
| 8,370,679 B1 | 2/2013 | Gawali et al. |

(Continued)

OTHER PUBLICATIONS

"Failover and Replication in a Cluster", © 2014 BEA Systems, 27 pages, <http://docs.oracle.com/cd/E11035_01/wls100/cluster/failover.html>.

(Continued)

*Primary Examiner* — Yolanda L Wilson
(74) *Attorney, Agent, or Firm* — Stephen R. Yoder

(57) ABSTRACT

Data integrity is maintained during failed communications between a member node of a primary cluster and a backup cluster by assigning an assisting member node to run an assisting process that transmits data entered into the member node to the backup cluster. In this way, a replicated database is maintained during a partial communication failure between the primary cluster and the backup cluster.

20 Claims, 8 Drawing Sheets

(56) References Cited

U.S. PATENT DOCUMENTS

| | | | |
|---|---|---|---|
| 8,898,388 B1* | 11/2014 | Kimmel | G06F 12/0802 711/103 |
| 2009/0006888 A1* | 1/2009 | Bernhard | G06F 11/08 714/6.12 |
| 2011/0238842 A1 | 9/2011 | Massa et al. | |
| 2013/0111261 A1 | 5/2013 | Dalton | |
| 2014/0047263 A1* | 2/2014 | Coatney | G06F 11/2023 714/4.11 |
| 2015/0278039 A1 | 10/2015 | Bogdanov et al. | |

OTHER PUBLICATIONS

IBM, "IBM DB2 10.5 with BLU Acceleration, the multiworkload database software for the era of big data, improves performance while helping to reduce storage costs", IBM Europe, Middle East, and Africa Software Announcement ZP13-0262, dated Apr. 23, 2013, Grace Period Disclosure planned availability date Jun. 14, 2013: Electronic delivery, pp. 1-37.

"17.6. MySQL Cluster Replication", Oracle, © 1997, 2014, 3 pages, Oracle and/or its affiliates, <http://dev.mysql.com/doc/refman/5.1/en/mysql-cluster-replication.html>.

"17.6.3 Known Issues in MySQL Cluster Replication", © 1997, 2014, 10 pages, Oracle and/or its affiliates, <http://docs.oracle.com/cd/E17952_01/refman-5.1-en/mysql-cluster-replication-issues.html>.

* cited by examiner

HANDLING FAILED CLUSTER MEMBERS WHEN REPLICATING A DATABASE BETWEEN CLUSTERS

STATEMENT ON PRIOR DISCLOSURES BY AN INVENTOR

Various aspects of the present invention have been disclosed by, or on behalf of, an inventor or a joint inventor generally to the public in the product DB2 10.5, made publically available on Jun. 14, 2013.

The following disclosure(s) are submitted under 35 U.S.C. 102(b)(1)(A) as prior disclosures by, or on behalf of, a sole inventor of the present application or a joint inventor of the present application:

(i) IBM DB2 10.5 Product Announcement (planned availability date Jun. 14, 2013, page 2).

BACKGROUND

The present invention relates generally to the field of databases, and more particularly to fault handling in databases. Databases with requirements for high availability are often run on multiple member nodes that are organized into clusters. It is known that a set of clusters hosting a database should preferably be designed to: (i) continue to operate properly even upon occurrence of a hardware failure; and (ii) continue to operate properly even when experiencing increased demand or software upgrades. Because clusters are at risk from disaster events (such as fires, floods, and power failures), disaster recovery solutions are customarily designed to replicate the entire cluster on another, geographically separate cluster.

With a replicated database running on a cluster architecture, a user has access to connect to and alter data from any member node in the primary cluster. Therefore, each member node in the primary cluster must ship its logs to the standby cluster for replication. Further, each member node in the standby cluster needs a copy of all changes from all member nodes in the primary cluster. An example arrangement of a cluster architecture is where there is only one active node (referred to as the replay master) in the standby cluster while all of the member nodes in the primary cluster are active. The member nodes in the primary cluster connect to the replay master and ship their logs to the replay master. The replay master handles log merging, that is, when the standby cluster takes over from the primary cluster, the replay master brings up all of the rest of the member nodes in the standby cluster and provides a consistent log to those member nodes.

SUMMARY

A method including: sending, by a first node in a first cluster to a first node in a second cluster, at least a portion of a set of logs; detecting a communication failure condition with respect to the sending of the set of logs; responsive to detection of the communication failure condition, determining an assisting node which is in the first cluster; and responsive to determination of the assisting node, sending, by the assisting node in the first cluster to the first node in the second cluster, at least a portion of the set of logs. The set of logs relate to physical database replication among shared disk database systems.

DETAILED DESCRIPTION

Figure 1:
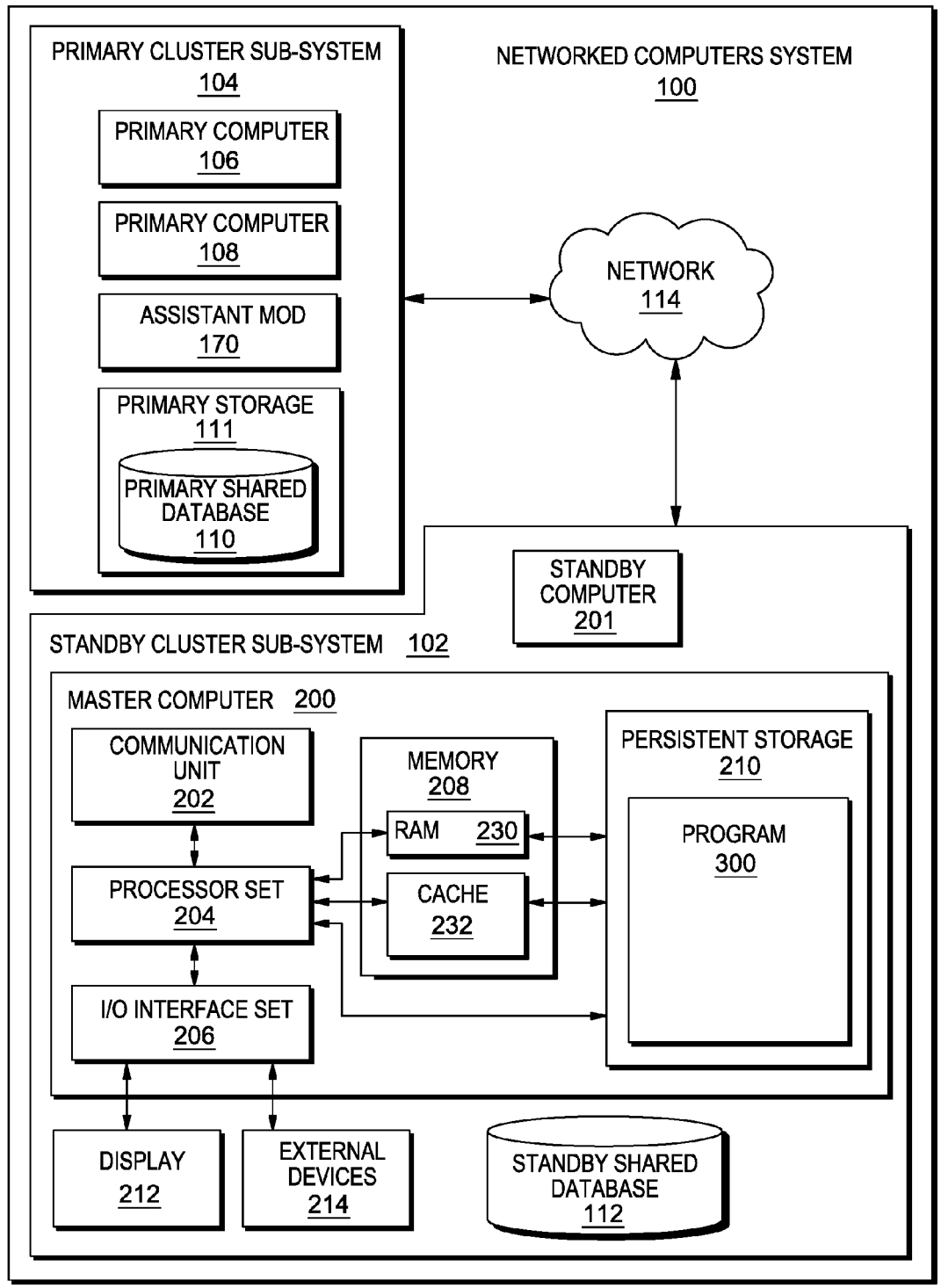
FIG. 1 is a schematic view of a first embodiment of a networked computers system according to the present invention.

Data integrity is maintained during failed communications between a member node of a primary cluster and a backup cluster by assigning an assisting member node to run an assisting process that transmits data entered into the member node to the backup cluster. In this way, a replicated database is maintained during a partial communication failure between the primary cluster and the backup cluster. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of a networked computers system 100, including: standby cluster sub-system 102; communication network 114; primary cluster sub-system 104; master computer 200; standby computer 201; communication unit 202; processor set 204; input/output (i/o) interface set 206; memory device 208; persistent storage device 210; display device 212; external device set 214; random access memory (RAM) devices 230; cache memory device 232; program 300; standby shared database 112; primary computers 106, 108; assistant module 170; primary storage 111; and primary shared database 110.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. Example Embodiment

Figure 2:
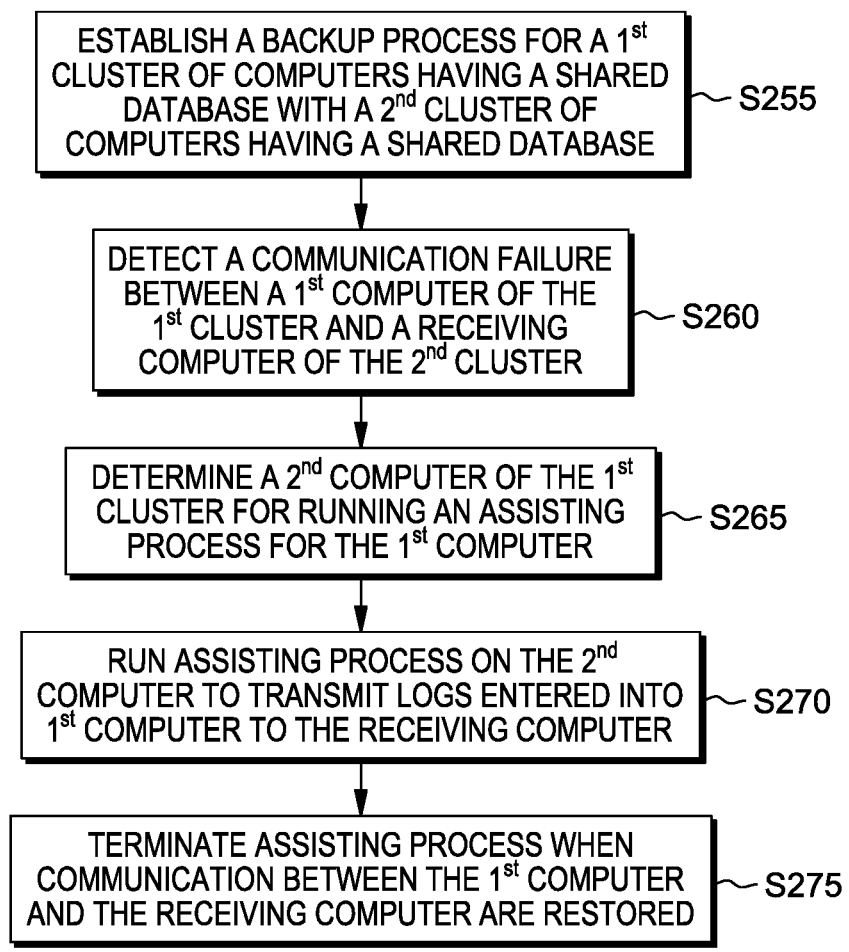
FIG. 2 is a flowchart showing a process performed, at least in part, by the first embodiment computers system.
Figure 3:
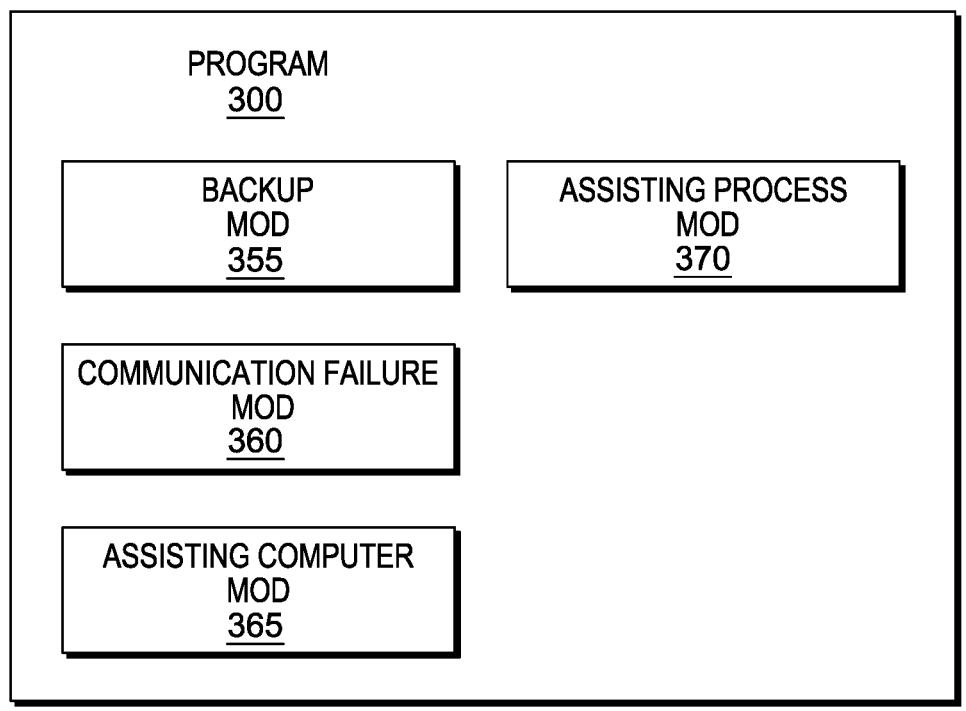
FIG. 3 is a schematic view of a software portion of the first embodiment computers system.

FIG. 2 shows a flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S255, where backup module (or "mod") 355 establishes a backup process for primary shared database 110 (FIG. 1), using standby cluster 102 (FIG. 1) and its standby database 112 (FIG. 1), which will act as the backup database for primary database 110. In this embodiment, the backup process is an asynchronous replication process. Alternatively, the backup process can be: (i) a mirroring process; and/or (ii) a log shipping process. Further, in this embodiment, the backup process occurs over network 114 (FIG. 1).

Processing proceeds to step S260, where communication failure module 360 detects a communication failure between primary computer 106 (FIG. 1) of primary cluster 104 and master computer 200 (FIG. 1) of standby cluster 102. When a communication failure occurs, the resulting effects may include one or more of the following problems: (i) data inconsistency; (ii) database corruption; and/or (iii) failure to ship transaction logs. In this embodiment, mod 360 waits for a predetermined period of time after detecting the failure condition before moving to step S265. In that way, a temporary communication problem is able to recover without triggering the assisting process that follows. Alternatively, processing proceeds to step S265 immediately upon detecting a communication failure. Whether or not there is a lapse of time, and/or other preconditions that must occur before responsive action is taken in response to the detection of the failure condition, the present document would still characterize step S265 as being "responsive to the detection of the failure condition."

Processing proceeds to step S265, where assisting computer module 365 determines an assisting computer of primary cluster 104 for running an assisting process thread on behalf of primary computer 106, which is experiencing a failure in communication. The assisting computer is an active computer within the primary cluster of computers. In this simple example, there is just one other computer in the primary cluster, specifically primary computer 108. In alternative embodiments, the assisting computer may be determined based on various factors discussed below in the Further Comments and/or Embodiments section of this Detailed Description. The factors may include one, or more, of the following: (i) processing capacity; (ii) relative physical distance from the computer experiencing a failure in communication; (iii) beginning a planned reboot; and/or (iv) valid authentication information.

Processing proceeds to step S270, where assisting process module 370 manages an assisting process through assistant module 170 (FIG. 1) via primary computer 108, the assisting computer, to transmit logs from primary computer 106 to master computer 200. Mod 370 changes the endpoint of the network socket corresponding to communication with primary computer 106 to primary computer 108 while the communication failure condition exists. In some cases, logs entered into the primary computer are not transmitted to the master computer prior to a communication failure. Primary computer 108 gets the untransmitted logs from primary storage 111, where failed node 106 was (and may still be) writing the logs. According to the assisting process, the assisting computer transmits the untransmitted logs to the master computer. In other cases, user access to a primary computer continuing after a communication failure results in the ongoing creation of new logs that are not transferred to the master computer due to the communication failure. These new logs are also transmitted to the master computer through the assisting process. Each time a successful commit of a transaction on primary computer 106 occurs, a record, or transaction log, is created on primary storage 111. The record created by primary computer 106 is available to the assisting computer in the case of a failure of the primary computer.

Processing ends at step S275, where assisting process mod 370 terminates the assisting process when communication between primary computer 106 and master computer 200 are restored. In this embodiment, the original configuration data, or dataset, for the connection between master computer 200 and primary computer 106 is maintained. Alternatively, the configuration data is discarded. Termination of the assisting process and recovery of original communication path(s) is described in more detail below in the Further Comments and/or Embodiments section of this Detailed Description.

III. Further Comments and/or Embodiments

Some embodiments of the present invention recognize the following facts, potential problems and/or potential areas for improvement with respect to the current state of the art: (i) conventionally, if a member node of a replicated cluster of nodes fails, the transactions made on the failed node require reintegration that may be extensive; (ii) if a member node of a replicated cluster of nodes fails, the transactions made on the failed node are dropped; (iii) if a member node of a replicated cluster of nodes fails, the transactions made on the failed node potentially corrupt the database; (iv) conventionally, synchronous modes of operation are employed so that a transaction is not committed until it is verified as written to disk on all members of all clusters; and/or (v) synchronous modes of operation generally reduce performance of the replication system.

Some embodiments of the present invention may include one, or more, of the following features, characteristics and/or advantages: (i) handles connection failures when replicating a database; (ii) retains data, such as transaction logs, when replicating across clusters; (iii) allows other member nodes within the primary cluster to substitute an extra process running on those nodes with a process that was running on a member suffering a hardware or a network failure; (iv) allows replication of data to continue despite a member node experiencing failed communication with the replay master node, thus ensuring data integrity; (v) allows for reliable operation in asynchronous modes without loss of transactions; (vi) allows for reliable operation in asynchronous modes without later reintegration; and/or (vii) a method for detecting failure of a member node in a cluster and selecting an assisting member node.

Some embodiments of the present invention may include one, or more, of the following features, characteristics and/or advantages: (i) each member node in the primary cluster broadcasts, or multicasts, heartbeat packets via the user datagram protocol to every other member node in the primary cluster in a manner that is blind with no acknowledgement being sought; (ii) each member node in the primary cluster maintains an internal state showing which member nodes are active and visible and which member nodes are not by listening for heartbeat packets transmitted from every other member node in the primary cluster; (iii) the heartbeat packet of each member node contains information on how many log streams the member node is currently serving to indicate the load that the computer system is under; (iv) the heartbeat packet of each member node contains information on capacity of the hardware for each corresponding node; (v) the heartbeat packet of each member node contains information on how much capacity of the hardware is in use for each corresponding node; (vi) each node has a key-value store for storing performance data over time; (vii) extraordinary heartbeat packets are transmitted to signal important state changes to other member nodes (for example, beginning a planned reboot of a member node); (viii) the replay master node uses extraordinary heartbeat packets to determine whether or not a node communication failure is temporary; (ix) the replay master node determines which node to use as an assisted node based on hardware capacity to protect against overloading member nodes in a heterogenous hardware environment; (x) the replay master node determines which node to use as an assisted node based on hardware capacity to protect against overloading member nodes in an environment where more than one node has failed; (xi) heartbeat packets provide for automatically locating other member nodes in a configured replicated cluster system; (xii) heartbeat packets provide for automatically configuring a new member node to be added to the cluster system; and/or (xiii) heartbeat packets include authentication information to provide for system security.

Figure 4:
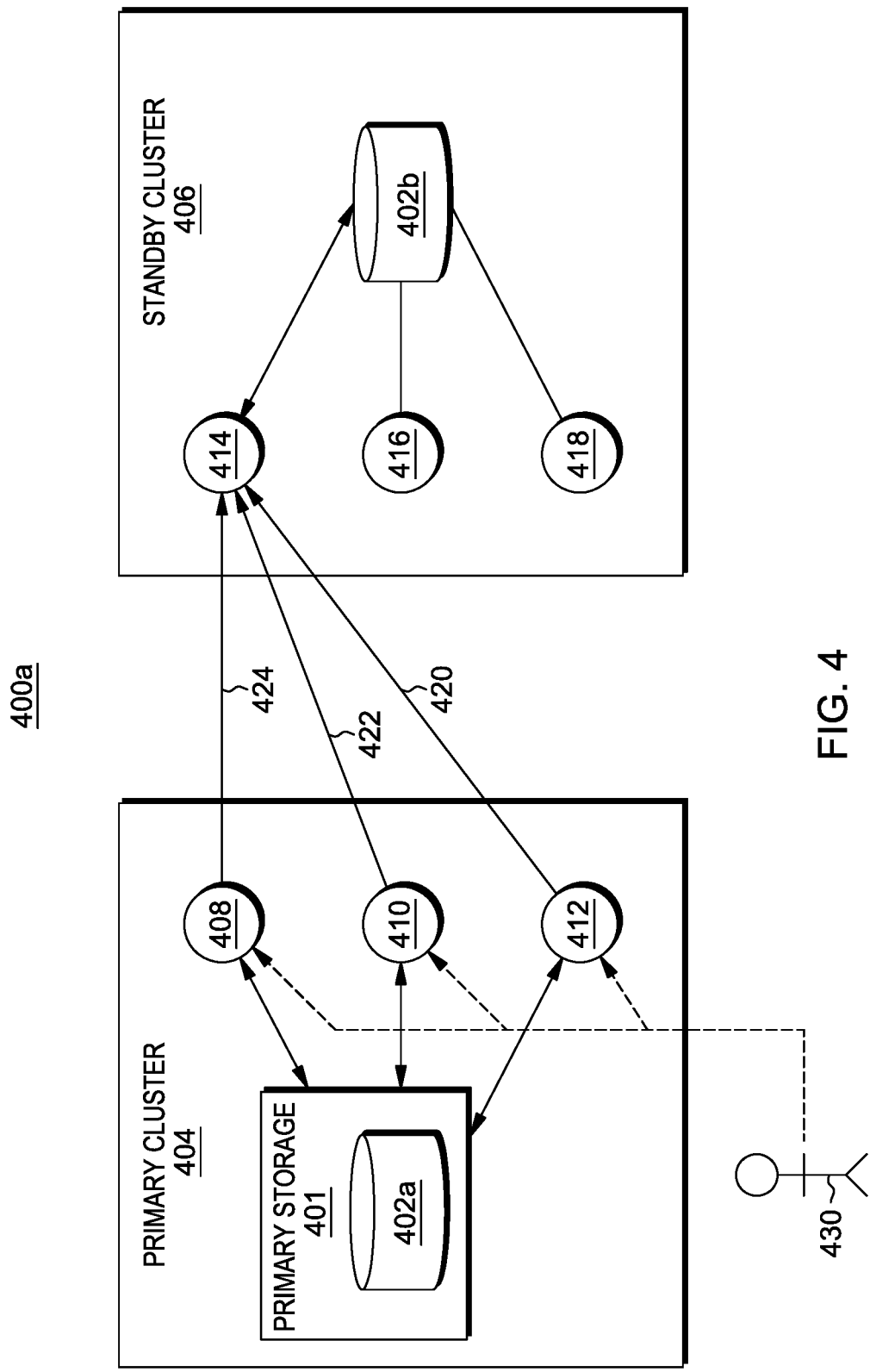
FIG. 4 is a first schematic view of a second embodiment of a networked computers system.

FIG. 4 depicts replicated databases 402a, 402b running on shared disk cluster architecture 400a according to an embodiment of the present invention. The cluster architecture includes: primary storage 401; primary database 402a; standby database 402b; primary node cluster 404; standby node cluster 406; primary member nodes 408, 410, 412; replay master node 414; standby member nodes 416, 418; log routes 420, 422, 424; and user 430. In such a system, as the one depicted in FIG. 4, hardware failures and/or network failures on an individual cluster member can cause significant corruption to the database. Consider the following example scenarios with reference to FIGS. 5 and 6.

Figure 5:
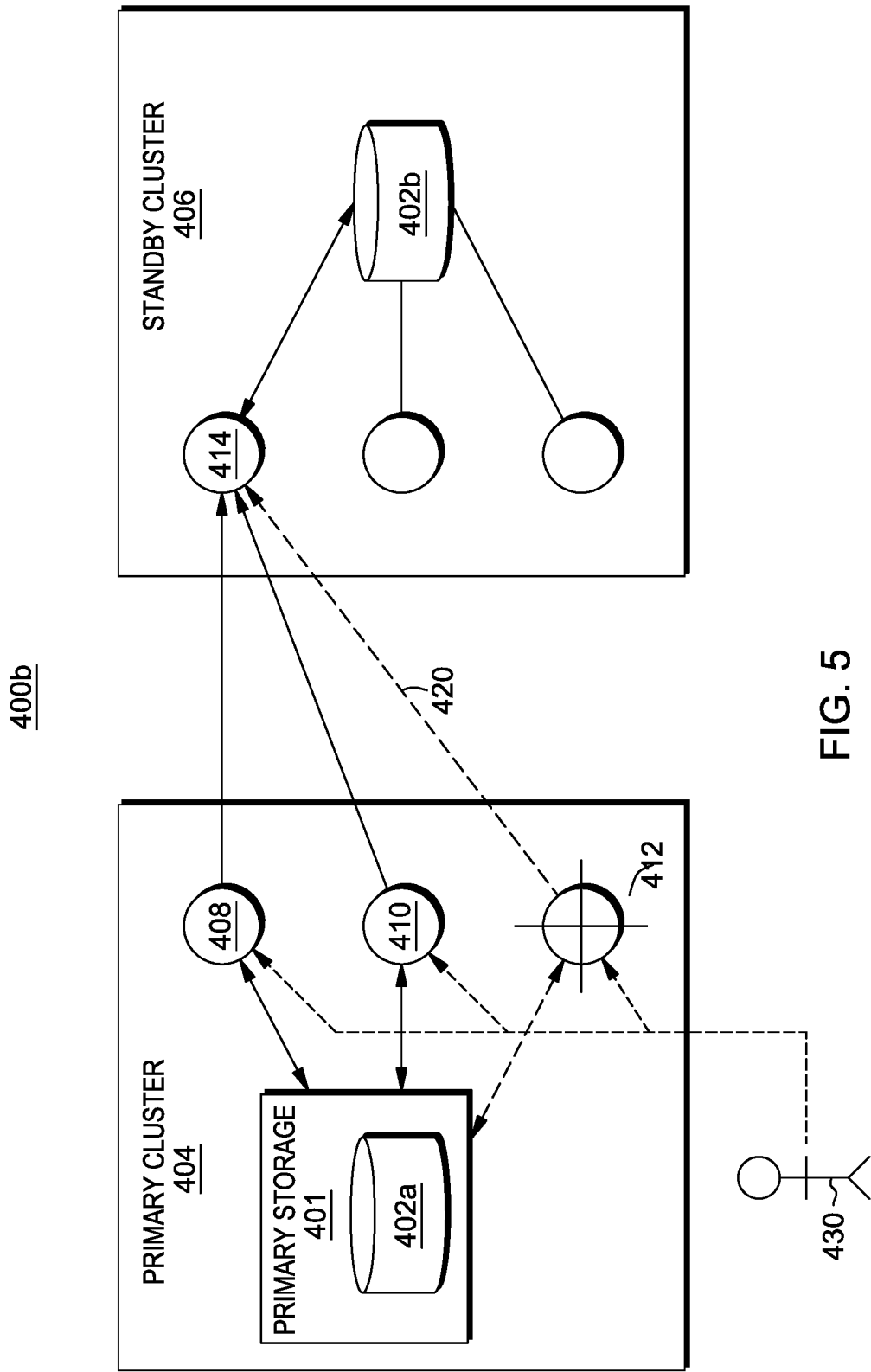
FIG. 5 is a second schematic view of the second embodiment computers system.

In FIG. 5, shared disk cluster architecture 400b depicts failed primary member node 412. A sudden failure caused the node to shut down. For example, a failure may occur when: (i) a component of member node 412 fails; or (ii) there is a power failure affecting just member node 412. Meanwhile, member nodes 408 and 410 are still online and active. When member node 412 is down, no logs are shipped from that node. In this example, there is confusion on the part of replay master node 414 as to the status of member node 412. Further, it is possible in certain modes of operation that user 430 could have committed a transaction on member node 412, which was not transferred to the replay master prior to the failure. Such an incomplete and/or terminated transfer of data may result in: (i) data inconsistency; and/or (ii) database corruption.

Figure 6:
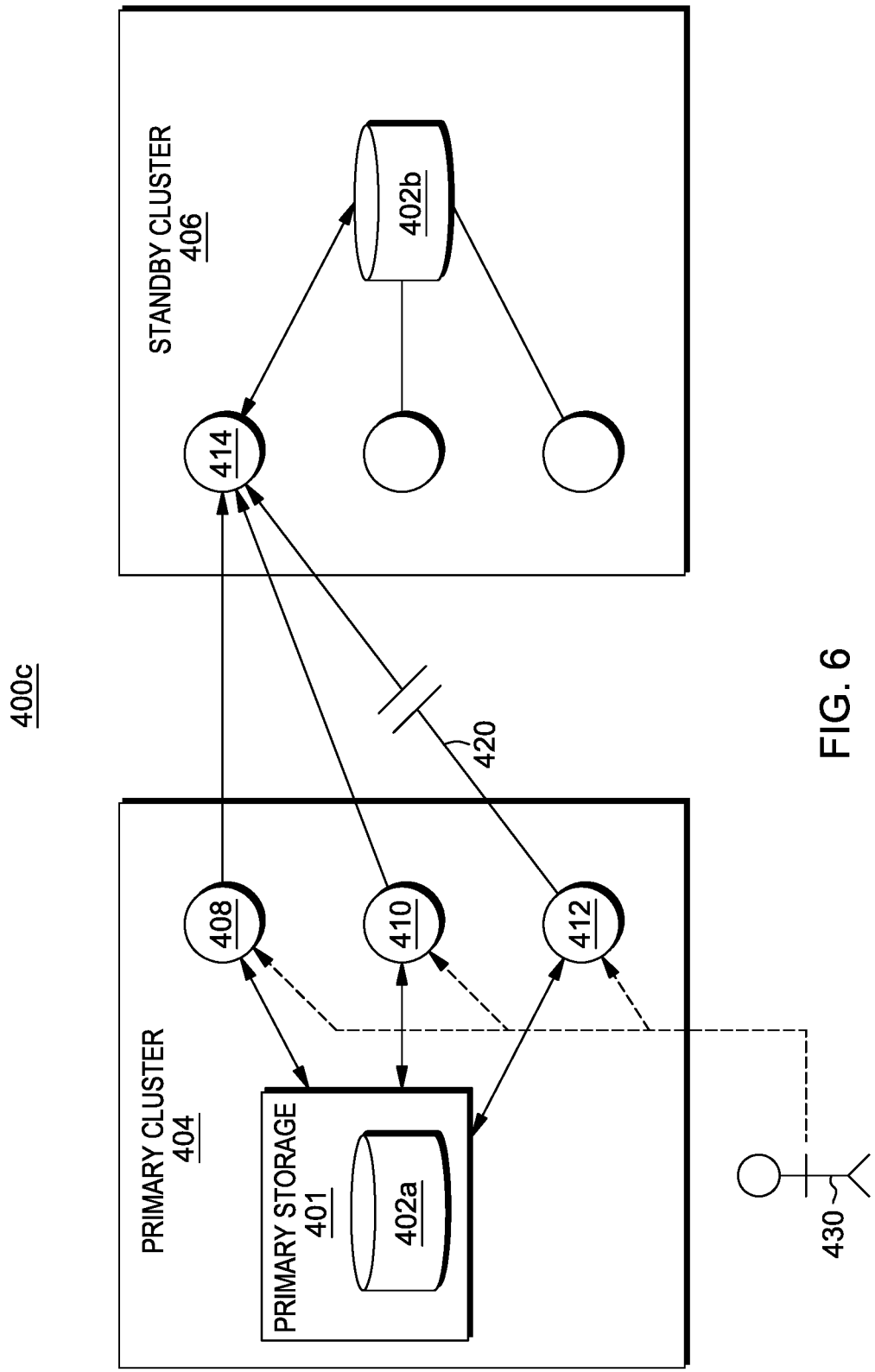
FIG. 6 is a third schematic view of the second embodiment computers system.

In FIG. 6, shared disk cluster architecture 400c depicts primary member node 412 having two network cards (not shown), one for the external network to talk to user 430, and another for the internal network to talk to the standby cluster. In this example, the user can continue to connect to primary member 412 and create logs, or alter data, in primary storage 401, but the transaction logs cannot be shipped to the replay master node due to a network failure, that is, log route 420 is interrupted. Alternatively, any failure in the network log route between primary member 412 and replay master node 414 will cut off the primary member node from the replay master node, but not from users. This condition potentially causes data inconsistency and database corruption.

In some embodiments of the present invention, replay master node 414 monitors its connections to the member nodes 408, 410, 412 in the primary cluster 404. The replay master may lose contact with a member node in the primary cluster when: (i) the member node fails (FIG. 5); and/or (ii) the log route is interrupted (FIG. 6). When the replay master node loses contact with any member node 408, 410, 412, the replay master node waits for a predetermined period of time in case the communication problem is temporary. The replay master then designates the dropped member node as the assisted node. Alternatively, any lost contact with a member node results in the designation of an assisted node.

Figure 7:
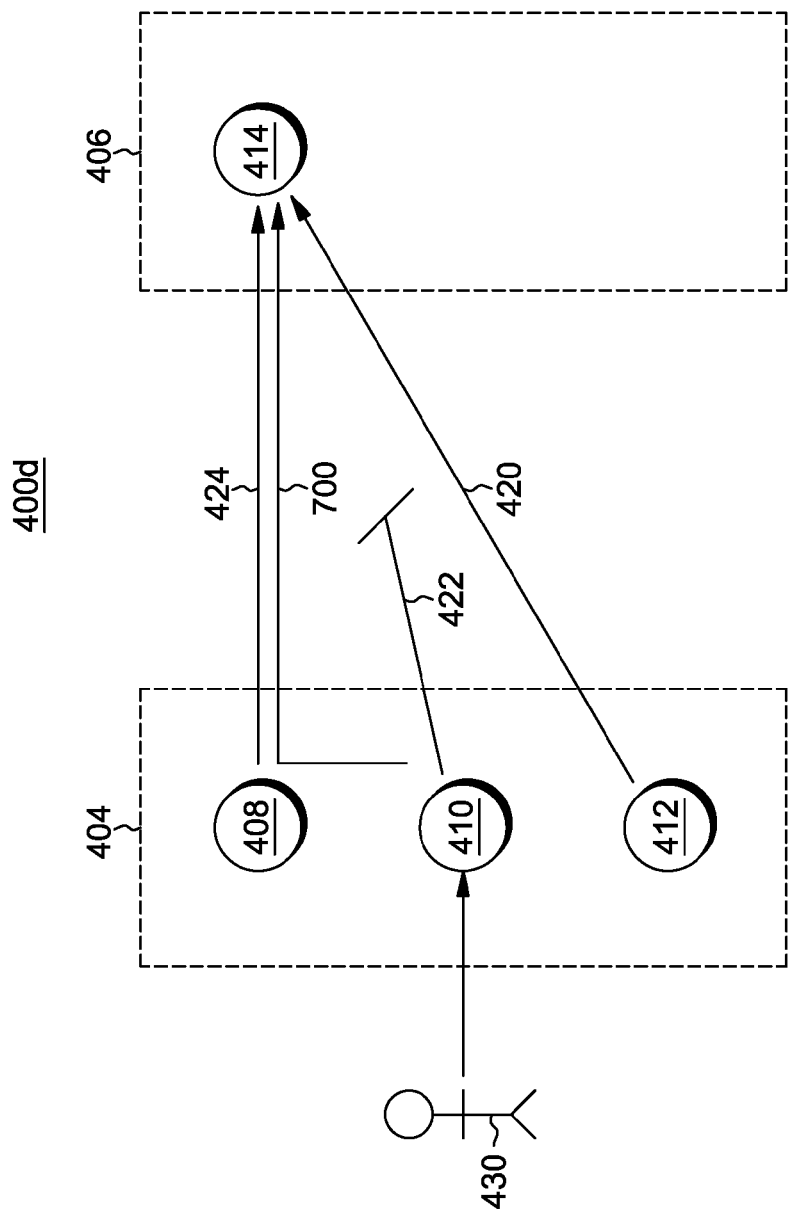
FIG. 7 is a fourth schematic view of the second embodiment computers system.

FIG. 7 depicts shared disk architecture 400d including assisted log route 700. Replay master node 414 designates active member node 408 of primary cluster 404 as the assisting node. The replay master node then takes the network socket (not shown) that was being used to communicate with the assisted node and changes its endpoint from the assisted node to the designated assisting node for the duration of the communication failure. In some embodiments of the present invention, the original configuration data, or dataset, for the connection to the assisted node is maintained. Alternatively, the configuration data is discarded.

Figure 8:
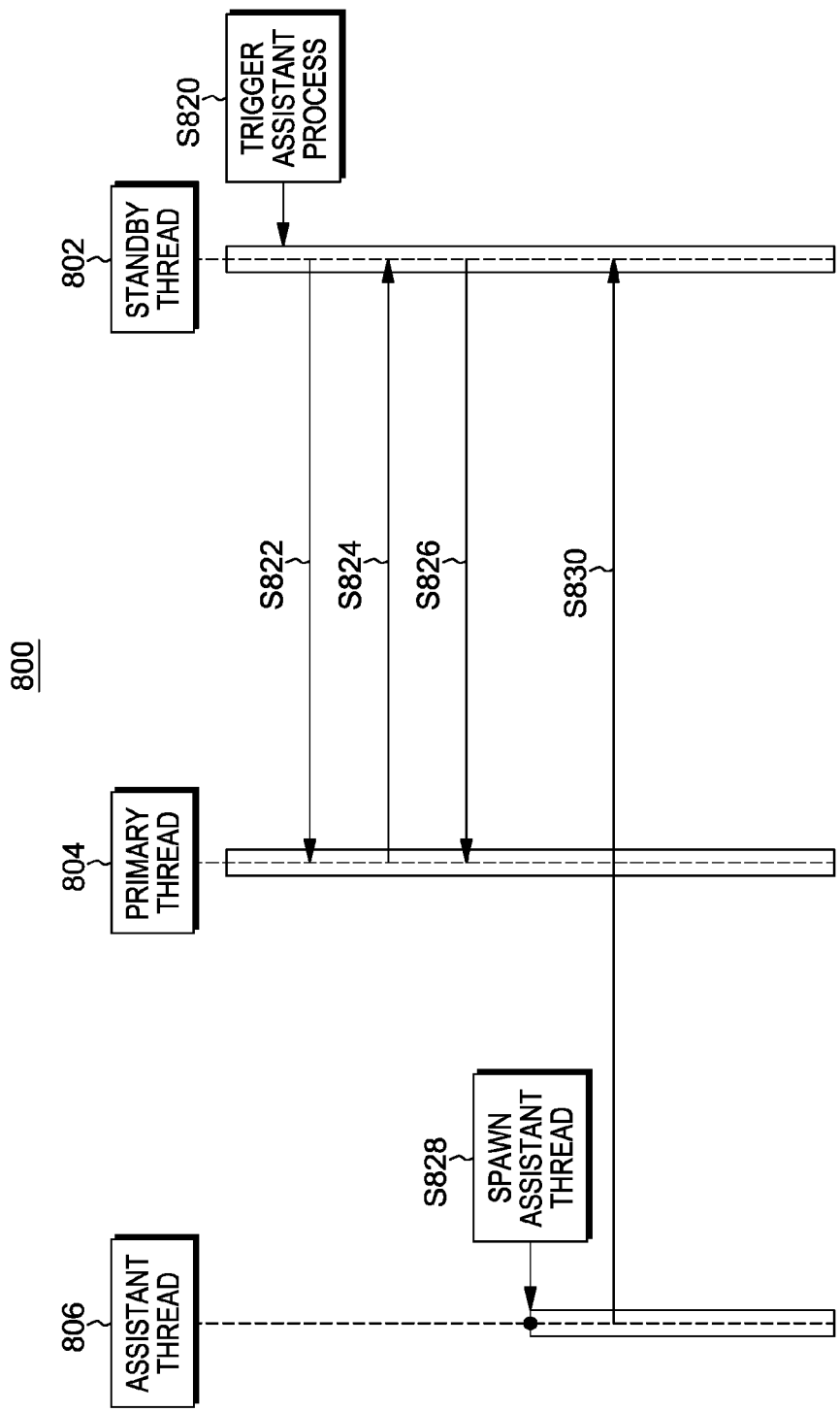
FIG. 8 is a sequence diagram of a process performed, at least in part, by the second embodiment computers system.

FIG. 8 is sequence diagram 800 showing events following the loss of communication over log route 422 between assisting node 408 and replay master 414 according to an embodiment of the present invention. The discussion that follows will discuss the process illustrated in the sequence diagram.

Processing begins at step S820 where standby thread 802, running on the replay master, receives a triggering event. Generally speaking, this triggering event is the loss of communication with a member node.

Processing proceeds to step S822 where replay master 414 sends a request to connect with assisting node 408. The request is received by primary thread 804 of the assisting node.

Processing proceeds to step S824 where the assisting node accepts the replay master's request for a connection.

Processing proceeds to step S826 where replay master 414 sends a request to assisting node 408, identifying assisted node 410.

Processing proceeds to step S828 where assisting node 408 spawns a new thread, assistant thread 806, upon receipt of the request from step S826. On the assistant thread, the assisting node creates a new process, the assisting process, to provide the requested assistance to the assisted node. The assisting process runs in parallel with the regular database process already running on primary thread 804 of the assisting node.

Processing is completed at step S830 where assisting node 408 accesses the log pages generated by the assisted node via the assisting process in order to compensate for the loss of communication as triggered in step S820. The assisting node forwards the log pages generated by the assisted node over log route 700 (parallel to existing log route 424) to the replay master node. Log pages generated by the assisted node are forwarded over log route 700 until a terminate condition arises, such as when communication between the assisted node and the replay master node are restored. The log pages include all the metadata that the assisted node would have generated for the replay master had communications not been lost.

As mentioned above, one terminate condition is that the assisted node has recovered such that communications over log route 422 to the replay master node are restored. In some embodiments, when the assisted node recovers, it attempts to reconnect, as normal, to the replay master. When the replay master accepts the connection attempt from the assisted node, it closes the connection to the assisting node and corresponding log route 700. In this embodiment, the assisting process self-terminates when the following conditions are met: (i) the assisting process detects a shutdown of the connection to the replay master; and (ii) the assisting node detects that the assisted node is now active. Further, in this embodiment, the assistance to the assisted node is rendered transparently from the point of view of the assisted node.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded device style computers, application-specific integrated circuit (ASIC) based devices.

What is claimed is:

1. A method comprising:
   determining a communication failure between a node of a primary cluster and a node of a backup cluster, the backup cluster having a replicated database of the primary cluster;
   identifying a second node in the primary cluster to assist in communicating at least a portion of a set of logs to the node of the backup cluster, the set of logs generated by successful commit activity in the primary cluster; and
   causing the second node to send to the node of the backup cluster at least a portion of the set of logs;
   wherein:
   the communication failure occurred while the node of the primary cluster attempted to send the set of logs to the node of the backup cluster.

2. The method of claim 1 wherein causing the second node to send to the node of the backup cluster at least the portion of the set of logs includes:
   reassigning a network socket previously used for communication by the node of the primary cluster to the node in the backup cluster; and
   changing an endpoint of the network socket from the node of the primary cluster to the second node.

3. The method of claim 1 further comprising:
   maintaining a configuration dataset for communication between the node of the primary cluster and the node of the backup cluster, the configuration dataset being used for communication before the communication failure.

4. The method of claim 1 wherein communication by the node of the primary cluster to the node of the backup cluster is restored when the communication failure is resolved.

5. The method of claim 1 wherein replication of the replicated database is an asynchronous process.

6. The method of claim 5 wherein identifying the second node in the primary cluster to assist in communicating at least the portion of the set of logs to the node of the backup cluster includes:
   sending a request to the second node;
   identifying the node of the primary cluster;
   instructing the second node to create an assisting process that runs in parallel with a regular database process already running on the second node, the process including accessing at least the portion of the set of logs; and
   forwarding at least the portion of the set of logs to the node of the backup cluster.

7. The method of claim 6 further comprising:
   directing the assisting process to terminate.

8. The method of claim 1 wherein at least the portion of the set of logs includes metadata that the node of the primary cluster generated during the communication failure.

9. A computer program product comprising a computer-readable storage medium having a set of instructions stored therein which, when executed by a processor, causes the processor to maintain data integrity during communication between a primary cluster and a backup cluster by:
   determining a communication failure between a node of a primary cluster and a node of a backup cluster, the backup cluster having a replicated database of the primary cluster;
   identifying a second node in the primary cluster to assist in communicating at least a portion of a set of logs to the node of the backup cluster, the set of logs generated by successful commit activity in the primary cluster; and
   causing the second node to send to the node of the backup cluster at least a portion of the set of logs;
   wherein:
   the communication failure occurred while the node of the primary cluster attempted to send the set of logs to the node of the backup cluster.

10. The computer program product of claim 9 wherein causing the second node to send to the node of the backup cluster at least the portion of the set of logs includes:
    reassigning a network socket previously used for communication by the node of the primary cluster to the node in the backup cluster; and
    changing an endpoint of the network socket from the node of the primary cluster to the second node.

11. The computer program product of claim 9 further comprising:
    maintaining a configuration dataset for communication between the node of the primary cluster and the node of the backup cluster, the configuration dataset being used for communication before the communication failure.

12. The computer program product of claim 9 wherein communication by the node of the primary cluster to the node of the backup cluster is restored when the communication failure is resolved.

13. The computer program product of claim 9 wherein replication of the replicated database is an asynchronous process.

14. The computer program product of claim 13 wherein identifying the second node in the primary cluster to assist in communicating at least the portion of the set of logs to the node of the backup cluster includes:
    sending a request to the second node;
    identifying the node of the primary cluster;
    instructing the second node to create an assisting process that runs in parallel with a regular database process already running on the second node, the process including accessing at least the portion of the set of logs; and
    forwarding at least the portion of the set of logs to the node of the backup cluster.

15. The computer program product of claim 14 further comprising:
    directing the assisting process to terminate.

16. The computer program product of claim 9 wherein at least the portion of the set of logs includes metadata that the node of the primary cluster generated during the communication failure.

17. A computer system comprising:
    a processor set; and
    a computer readable storage medium;
    wherein:
    the processor set is structured, located, connected, and/or programmed to run program instructions stored on the computer readable storage medium; and
    the program instructions which, when executed by the processor set, cause the processor set to maintain data integrity during communication between a primary cluster and a backup cluster by:
    determining a communication failure between a node of a primary cluster and a node of a backup cluster, the backup cluster having a replicated database of the primary cluster;
    identifying a second node in the primary cluster to assist in communicating at least a portion of a set of logs to the node of the backup cluster, the set of logs generated by successful commit activity in the primary cluster; and causing the second node to send to the node of the backup cluster at least a portion of the set of logs;

wherein:

the communication failure occurred while the node of the primary cluster attempted to send the set of logs to the node of the backup cluster.

18. The computer system of claim 17 wherein causing the second node to send to the node of the backup cluster at least the portion of the set of logs includes:

reassigning a network socket previously used for communication by the node of the primary cluster to the node in the backup cluster; and changing an endpoint of the network socket from the node of the primary cluster to the second node.

19. The computer system of claim 17 further comprising:

maintaining a configuration dataset for communication between the node of the primary cluster and the node of the backup cluster, the configuration dataset being used for communication before the communication failure.

20. The computer system of claim 17 wherein at least the portion of the set of logs includes metadata that the node of the primary cluster generated during the communication failure.

* * * * *